(12) United States Patent
Ekambaram et al.

(10) Patent No.: US 11,562,446 B2
(45) Date of Patent: Jan. 24, 2023

(54) SMART MEAL PREPARATION USING A WEARABLE DEVICE FOR ACCOMMODATING CONSUMER REQUESTS

(71) Applicant: International Business Machines Corporation, Armonk, NY (US)

(72) Inventors: Vijay Ekambaram, Chennai (IN); Smitkumar Narotambhai Marvaniya, Bangalore (IN); Sarbajit K. Rakshit, Kolkata (IN); Saravanan Sadacharam, Chennai (IN)

(73) Assignee: International Business Machines Corporation, Armonk, NY (US)

( * ) Notice: Subject to any disclaimer, the term of this patent is extended or adjusted under 35 U.S.C. 154(b) by 376 days.

(21) Appl. No.: 16/549,658

(22) Filed: Aug. 23, 2019

(65) Prior Publication Data
US 2021/0056648 A1    Feb. 25, 2021

(51) Int. Cl.
G06Q 50/12    (2012.01)
G06N 20/00    (2019.01)
H04W 4/12    (2009.01)
G06Q 30/06    (2012.01)

(52) U.S. Cl.
CPC .............. *G06Q 50/12* (2013.01); *G06N 20/00* (2019.01); *G06Q 30/0635* (2013.01); *H04W 4/12* (2013.01)

(58) Field of Classification Search
CPC combination set(s) only.
See application file for complete search history.

(56) References Cited

U.S. PATENT DOCUMENTS

| | | | |
|---|---|---|---|
| 7,762,181 B2 | 7/2010 | Boland et al. | |
| 8,145,854 B1 | 3/2012 | Lee | |
| 8,249,946 B2 * | 8/2012 | Froseth | G06Q 10/101 |
| | | | 426/103 |
| 9,254,099 B2 | 2/2016 | Connor | |

(Continued)

FOREIGN PATENT DOCUMENTS

WO    2005111955 A1    11/2005

OTHER PUBLICATIONS

Eysenbach et al., "A Mobile Phone Food Record App to Digitically Capture Dietary Intake for Adolescents in a Free-Living Environment: Usability Study," https://www.ncbi.nlm.nih.gov/pmc/articles/PMC4381810/, published online Mar. 13, 2015, JMIR Mhealth Uhealth, Jan.-Mar. 2015, 3(1):e30, 18 pgs.

(Continued)

*Primary Examiner* — Peter Ludwig
*Assistant Examiner* — Reva R Moore
(74) *Attorney, Agent, or Firm* — Scott Dobson

(57) ABSTRACT

Smart meal preparation can be performed where a consumer order for a food item and a consumer request related to the food item are received. One or more recipes for the food item are received. The one or more recipes are analyzed to determine a conflict with the consumer request. The consumer request and the determined conflict are transmitted to a wearable device worn by a cook who will prepare the food item. Alerts related to the conflict are provided to the cook via the wearable device during preparation of the food item. Preparation of the food item is monitored for compliance with the consumer request.

17 Claims, 6 Drawing Sheets

(56) References Cited

U.S. PATENT DOCUMENTS

| | | | |
|---|---|---|---|
| 9,552,461 B2 | 1/2017 | Harrison | |
| 9,644,847 B2 | 5/2017 | Bhogal et al. | |
| 2008/0060853 A1 | 3/2008 | Davidson et al. | |
| 2014/0249966 A1 | 9/2014 | Zaragoza et al. | |
| 2016/0140646 A1* | 5/2016 | Humphreys | G06Q 10/087 705/26.8 |
| 2017/0139385 A1* | 5/2017 | Young | G05B 19/048 |
| 2019/0053332 A1 | 2/2019 | Cheng et al. | |
| 2019/0146476 A1 | 5/2019 | Cella et al. | |
| 2019/0370916 A1* | 12/2019 | Surkin | H04L 67/53 |

OTHER PUBLICATIONS

Kohsaka et al., "Capturing the relationships between local foods and residents: A case in the Noto region, Japan," http://dx.doi.org/10/1016/j/jef/2016/05/001, J Ethn Foods 3 (2016) 86-92.

Koubai et al., "MyRestaurant: A Smart Restaurant with a Recommendation System," International Journal of Computing and Digital Systems, ISSN (2210-142X), Int. J. Com. Dig. Sys. 8, No. 2 (Mar. 2019), http://dx.doi.org/10.12785/ijcds/080206, 14 pgs.

Lee et al., "Assessing the Association of Food Preferences and Self-Reported Psychological Well-Being among Middle-Aged ad Older Adults in Contemporary China-Results from the China Health and Nutrition Survey," www.mdpi.com/1660-4601/15/3/463/pdf, International Journal of Environmental Research and Public Health, 2018, 13 pgs.

Mell et al., "The NIST Definition of Cloud Computing," Recommendations of the National Institute of Standards and Technology, U.S. Department of Commerce, Special Publication 800-145, Sep. 2011, 7 pgs.

Montgomery, L., "4 Smart Kitchen Appliances: Equipped with Artificial Intelligence-Electronic House," https://www.electronichouse.com/smart-home/4-smart-kitchen-appliances-equipped-artificial-intelligence, Feb. 21, 2017, printed Jun. 26, 2019, 2 pgs.

Pathrotkar, P., "Smart Kitchen Appliances Market Reaching Value US$ 2,730.6 Mn in 2022," https://cmfenews.com/smart-kitchen-appliances-market-reaching-value-us-2730-6-mn-2022, printed Aug. 21, 2019, 1 pg.

Ventura et al., "Early Influences on the Development of Food Review Preferences," https://www.sciencedirect.com/science/article/pii/S096098221300208X, Current Biology 23, R401-R408, May 6, 2013, © 2013 Elsevier ltd.

Wagner et al., "The nature and evolution of online food preferences," https://link.springer.com/article/10.1140/epjds/s13688-014-0036-7, EPJ Data Science, (2014) 3:38, 22 pgs.

* cited by examiner

SMART MEAL PREPARATION USING A WEARABLE DEVICE FOR ACCOMMODATING CONSUMER REQUESTS

BACKGROUND

The present disclosure relates generally to meal preparation, and more specifically to smart meal preparation using a wearable device for accommodating consumer requests.

In many circumstances, a person who wishes to eat a meal prepared by another person has individual requests for how the meal is to be prepared. For example, a consumer may have dietary restrictions, allergies, or other preferences for the ingredients to be used or steps to be taken during meal preparation. For some such consumer requests, strict adherence to these requests is vital, and in other situations, adherence to these requests is a matter of providing good quality service.

SUMMARY

Disclosed herein are embodiments of a method, system, and computer program product for smart meal preparation using a wearable device for accommodating consumer requests. Smart meal preparation can be performed where a consumer order for a food item and a consumer request related to the food item are received. One or more recipes for the food item are received. The one or more recipes are analyzed to determine a conflict with the consumer request. The consumer request and the determined conflict are transmitted to a wearable device worn by a cook who will prepare the food item. Alerts related to the conflict are provided to the cook via the wearable device during preparation of the food item. Preparation of the food item is monitored for compliance with the consumer request.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
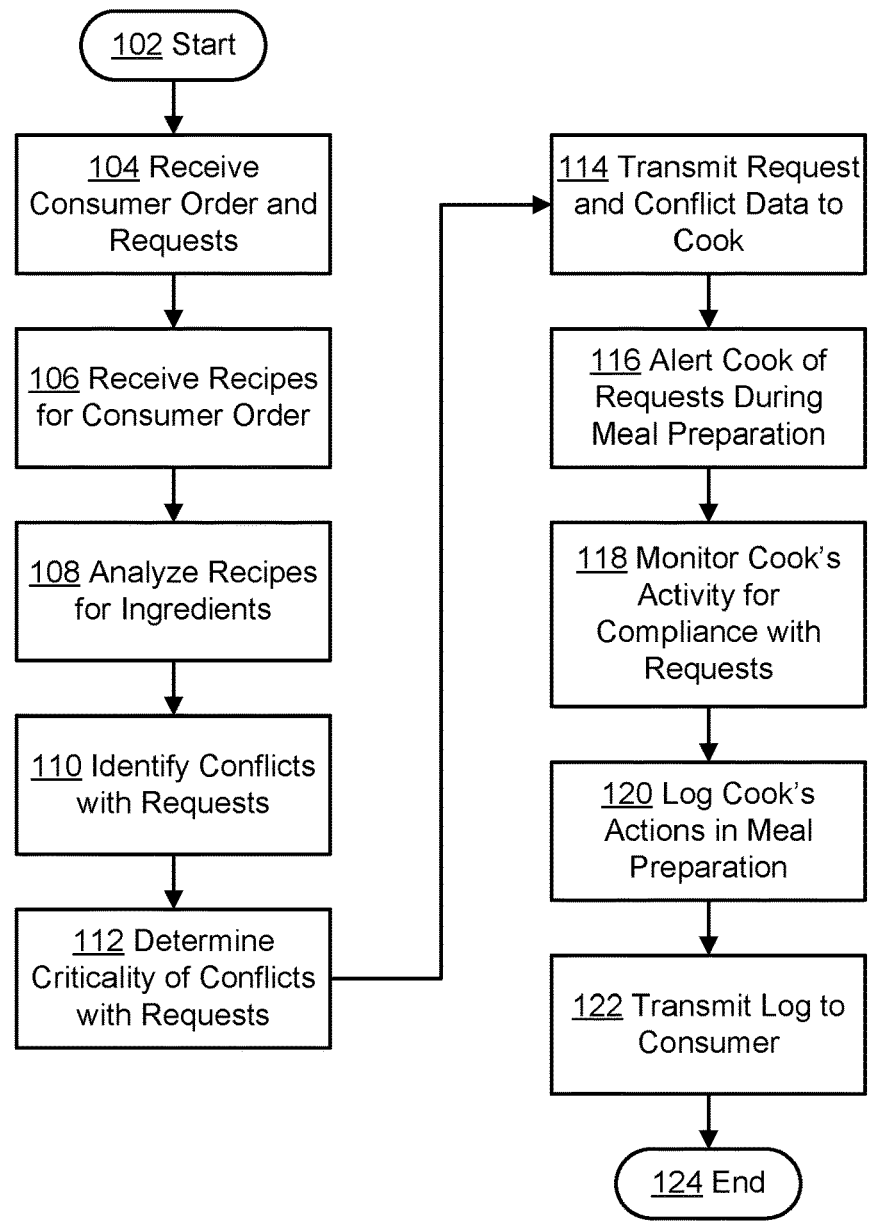
FIG. 1 depicts an example method for smart meal preparation using a wearable device for accommodating consumer requests, in accordance with embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure relate generally to meal preparation, and more specifically, to smart meal preparation using a wearable device for accommodating consumer requests. While the present disclosure is not necessarily limited to such applications, various aspects of the disclosure can be appreciated through a discussion of various examples using this context.

Many people have other people prepare their food from time to time, whether at a restaurant, event, or otherwise. In many circumstances, a person who wishes to consume a meal prepared by such other person has individual requests for how the meal is to be prepared. There can be many reasons a person may wish to avoid certain foods or substances in their food. For example, a consumer may have dietary restrictions for one reason or another, such as medically imposed (e.g., medical advice to avoid cholesterol, salt, alcohol, etc. or allergic reactions to certain foods), for purposes of losing weight (e.g., a low fat, low carbohydrate, or low calorie diet, a diet without a particular element such as sugar or butter, etc.), or for ethical concerns (e.g., vegetarian or vegan diets, religious preferences, preference for locally grown ingredients or grass fed animals, etc.). Other consumer requests can include personal preferences such as a person may dislike a certain ingredient and wish for it not to be included. Consumer requests can also relate to the steps to be taken during meal preparation, such as how a food item is cooked (e.g., pan fried, deep fried, baked, boiled, grilled, etc.), how well a food item is cooked (e.g., rare, medium-rare, medium, medium-well, well-done, blackened, gooey, crispy, etc.), whether a food item is cooked in butter, olive oil, or with a non-stick spray, or any other preference applicable to the type of food item being prepared.

For some such consumer preferences, strict adherence to these preferences is vital (e.g., allergic reactions), and in other situations, adherence to these preferences is a matter of providing good quality service. As discussed in more detail below with regard to operation 112 of FIG. 1, embodiments of the present disclosure provide for determining a criticality score for consumer requests such that more critical requests can be prioritized, and a cook can be given additional indications that such a request should be adhered to.

Typically, a consumer may voice their requests to a server (a person taking their order), or other person involved in the meal preparation, who is generally not the person preparing the meal. Because these requests must be relayed to the person preparing the meal such as a chef, cook, or baker (herein referred to as the "cook"), these requests can be overlooked, forgotten, or distorted in transmission. Even if the requests are successfully transmitted to the cook, a cook may be preparing many meals at once and may not be able to prepare meals consistent with the consumer requests without assistance.

Embodiments of the present disclosure provide for a method, system, and computer program product for smart meal preparation using a wearable device for accommodating consumer requests. A consumer can order a meal and provide consumer requests for the meal. This combination of order and requests can be received by a system which determines a recipe for the meal, including the ingredients and steps involved in preparing the meal. The system can identify ingredients and/or steps that are affected by the consumer requests using various data sources. A cook can be equipped with or wear a wearable device communicating with the system, which can communicate notifications to the cook. Containers and food preparation tools in a kitchen environment can be equipped with RFID tags or other beacons which emit a signal which the wearable device can receive. Using the consumer requests and the identified ingredients and/or steps that are affected by the consumer requests, the cook's wearable device can provide indications to the cook regarding these requests. These indications can include directions on a screen or haptic or audio cues when the cook comes into contact with, or proximity to, an ingredient or food preparation tool which relates to the consumer requests. The cook's interactions with ingredients and food preparation tools can be monitored during meal preparation, and a log of the cook's actions can be generated. This log can be provided to the consumer to verify compliance with the consumer's requests.

A smart meal preparation system and process using a wearable device for accommodating consumer requests as described herein can provide advantages over prior methods of meal preparation. As disclosed herein, many aspects of a kitchen environment can be automatically tracked and monitored for providing directions to a cook in real time regarding a consumer's requests, such that these requests can be more accurately adhered to. Additionally, the use of such a smart meal preparation system can provide assurance to a consumer that their consumer requests have been accurately carried out by reviewing the logs provided by the system, such that they can feel safe their wishes have been carried out and their food is safe to eat consistent with their requests. Such a system and process can also assist a cook in accurately performing their meal preparation and alleviate stress and time spent considering whether user requests have been forgotten or need to be followed, as the system will alert them when appropriate. These improvements and/or advantages are a non-exhaustive list of example advantages. Embodiments of the present disclosure exist which can contain none, some, or all of the aforementioned advantages and/or improvements.

Referring now to FIG. 1, depicted is an example method 100 for smart meal preparation using a wearable device for accommodating consumer requests, in accordance with embodiments of the present disclosure. Method 100 can include more or fewer operations than those depicted. Method 100 can include operations in different orders than those depicted. In some embodiments, method 100 can be performed by a meal preparation assistant system which can include a sensor-enabled kitchen environment (such as sensor-enabled kitchen environment 200 depicted in FIG. 2), a natural language processing system (such as natural language processing environment 300 depicted in FIG. 3), and/or by a computer system (such as computer system 400 depicted in FIG. 4).

From start 102, method 100 proceeds to operation 104 where the meal preparation assistant system receives a consumer order and consumer requests regarding the order. In some embodiments, these can be received simultaneously or substantially simultaneously, and in other embodiments, they may be received at separate times. In some embodiments, this can occur when a consumer vocally provides an order and consumer requests regarding the order, such as when verbally ordering food or beverages from a server. In such embodiments, the meal preparation assistant system can include an audio recorder which can pick up the vocalized order and requests and analyze the audio for its contents. In other embodiments, a consumer may be able to input an order and requests into a system directly, such as by selecting an order at a kiosk, an ordering tablet or other computing device at a table, or otherwise. An order can vary in embodiments and can include a drink order, a food order, or both, and can include multiple elements such as individual meals, components of a meal, or otherwise. As used herein, references to "food items" should be read to include references to beverages, food dishes, portions of food dishes, and meals.

Consumer requests can take many forms including those discussed above such as medically imposed dietary restrictions, dietary restrictions for purposes of losing weight, dietary restrictions for ethical concerns, personal preferences for ingredients, and preferences for steps to be taken during meal preparation. In some embodiments, a consumer may be able to save their preferences and/or previously used requests for future use by the meal preparation assistant system. For example, a consumer may be able to create an account and input a preference that they are vegetarian, such that all future orders placed by the user can access this account and automatically include a request that an order be prepared without meat products.

At 106, the meal preparation assistant system receives recipes for the consumer's order. A recipe can include a list of ingredients, quantities of the ingredients, one or more steps involved in preparing the food item(s), and additional information as appropriate. In some embodiments, this can entail identifying a meal or food item(s) in the consumer's order and associating this with an entry in a specific recipe database. For example, a restaurant may have a database of recipes used in the various food choices available at that restaurant. In some embodiments, this can involve searching a larger repository of recipes and/or the internet for matching recipes. This can occur in embodiments where a consumer orders an item not on a menu, when a repository of recipes for a restaurant is not available (e.g., a restaurant may not have a prepared database of recipes for use by the meal preparation assistant system), or when the meal preparation assistant system is used in a setting other than a restaurant, such as by a consumer hiring a personal chef. In some embodiments, the meal preparation assistant system can receive more than one recipe for the same food item, such as from different sources, which may include variation in the ingredients used, quantities used, or steps taken to prepare the food item. When multiple such recipes are received, the system can check all of these recipes to determine if a consumer's requests may require modification of at least one of the recipes.

At 108, the meal preparation assistant system analyzes the recipes from operation 106 to determine the ingredients involved in the recipes. In some embodiments, this can also include analyzing steps and/or activities involved in preparing the food items(s). Analyzing the ingredients involved in the recipes can involve using ontology building. The system can crawl the recipe details and build an ontology such that it can be easy for identifying ingredient details. The ontology can help in identifying the required ingredients in each of the cooking steps of preparing a food item. An ontology can break down a recipe into one or more subcomponents or cooking steps and break that down into one or more ingredients or actions involved in cooking steps. This ontology can then be used in identifying steps, ingredients, and quantities of ingredients for preparing the food items. In some embodiments, the meal preparation assistant system can use natural language processing on the received recipes to identify ingredients or cooking steps, which is discussed below in further detail with regard to FIG. 3. In some embodiments, pictorial recipes can be used, and a visual recognition system can identify depicted ingredients. However, a pictorial recipe may require manual input as determining ingredients for something like a sauce may not be possible from images alone. In some embodiments, a cook or other user can be presented with the determined ingredients and have an opportunity to adjust the automatically analyzed ingredients for correctness. Meal preparation steps can include activities such as mixing ingredients together, cooking ingredients, letting ingredients sit (e.g., to allow bread to rise), or any other activity involved in preparing food.

At 110, the meal preparation assistant system identifies conflicts in the recipes and identified ingredients and/or steps with the consumer requests. This can involve comparing the consumer requests with the results of the analysis from operation 108 and determining if there are matching ingredients and/or cooking steps. For example, if a consumer request was that a meal not include sugar and one of the ingredients of the recipe is sugar, a conflict can be determined to exist. In a more complicated example, if a user has requested that the food be prepared vegetarian, the meal preparation assistant system can include a listing of types of meat and animal products which do not satisfy a vegetarian request and compare that list with the ingredients of the recipe to determine if a match is present. In another example, if a consumer has requested that a meal be prepared with a low amount of carbohydrates, the meal preparation assistant system can identify the ingredients of the recipes which contain carbohydrates (which may involve accessing a nutritional information database), determine an amount of carbohydrates present in the quantity of those ingredients as analyzed in the recipes, and compare the amount of carbohydrates with a threshold value (which can be a value which a food item must be below to satisfy a consumer request of low carbohydrates). Similar matching can occur for determining whether a conflict exists for cooking steps or other consumer preferences. For example, if a user has requested that a chicken dish include grilled chicken (or the action of grilling chicken meat), and a recipe calls for fried chicken (or the action of frying chicken meat), a conflict can be identified.

At 112, the meal preparation assistant system determines the criticality of the conflicts with requests identified at operation 110. In some embodiments, determining the criticality of the conflicts with requests can involve estimating a criticality score. In some embodiments, determining the criticality of the conflicts can be based on the consumer inputs provided at operation 104. For example, if the meal preparation assistant system records an audio order where the consumer requests the meal be prepared without peanuts and vocalizes that this is due to a peanut allergy, the meal preparation assistant system can identify the word "allergy" and assign a high criticality to this request and any resultant conflicts with this request. In another example, if a consumer requests a food item be prepared kosher, or in accordance with other vocalized religious beliefs, the meal preparation assistant system can recognize the term "kosher" or other keywords present in a consumer request and assign a high criticality to the request and any resultant conflicts with the request. On the other hand, if a consumer request includes a statement that the consumer merely dislikes an ingredient, "prefers" that an action not be taken during food preparation, or otherwise vocalizes that a request is less important than another request made, a lower criticality score can be determined. In some embodiments where a user inputs requests and orders through a kiosk or other device, a user may be able to provide their own criticality score or provide a statement which can be analyzed for terms such as the allergy and kosher examples above.

In some embodiments, the meal preparation assistant system can be trained with, or adjusted based on feedback involving, types of consumer requests which if not adhered to, result in the food item being sent back to be prepared a second time, with correct adherence to the request. Over time, the types of consumer requests most likely to result in food sent back can be assigned high criticality scores, and the types of consumer requests which if not adhered to are tolerated by consumers (i.e., not sent back or not complained about) can be assigned lower criticality scores.

In some embodiments, determining the criticality score can be calculated using a binary classifier and may result in a score of critical or not critical. Using the recipe information as an input, along with consumer requests as another input, the meal preparation assistant system can identify a set of important steps that need to be performed while preparing a food item. A binary classifier can be trained which captures a relationship between the consumer requests and food preparation states. This can include a feature representation in the form of:

$$<f_1^{consumer\text{-}request}, \ldots, f_k^{consumer\text{-}request}, f_1^{cooking\text{-}state}, \ldots, f_n^{cooking\text{-}state}>$$

where each of $f^{consumer\text{-}request}$ from 1 through k represents a consumer request captured by the meal preparation assistant system and each of $f^{cooking\text{-}state}$ from 1 through n represents a cooking state which can be reached during preparation of a food item. This can be used with $\emptyset_{cooking\text{-}state}^{predictor}(u) \rightarrow [0,1]$ to identify all cooking states that can be affected due to consumer requests while preparing a food item. An output of 1 from the classifier could indicate a cooking state which can be affected due to consumer request while preparing a food item. An output of 0 from the classifier could indicate otherwise. This can be achieved by using a simple step function as the activation function for the classifier. For instance, if weighted output from the classifier is >0.5, the step function can map it to 1, otherwise it can map it to 0. There are other activation functions that can be used in classifiers, e.g., sigmoid, tan h, rectified linear unit (ReLU) in other embodiments. The cooking-state classifier can help in identifying a list of cooking states which needs to be carefully monitored during food preparation.

In some embodiments, an additional element can be used with the binary classifier, that being $f^{consumer\text{-}personalization}$ which corresponds to previously saved information regarding a consumer (which may be obtained if they are a repeat user of the meal preparation assistant system) or predicted information regarding a consumer (e.g., predicted preferences based on what similar consumers prefer, which can be based on many factors including demographic factors such as age, cultural factors, or other). A binary classifier can be trained that identifies the criticality of the consumer's food preferences while combining with the cooking consumer-request: $<f_1^{consumer\text{-}request}, \ldots, f_k^{consumer\text{-}request}, f_1^{cooking\text{-}state}, \ldots, f_n^{cooking\text{-}state}, f_1^{consumer\text{-}personalization}, \ldots, f_m^{consumer\text{-}personalization}>$ where each of $f^{consumer\text{-}request}$ from 1 through k represents a consumer request captured by the meal preparation assistant system, each of $f^{cooking\text{-}state}$ from 1 through n represents a cooking state which can be reached during preparation of a food item, and each of $f^{consumer-personalization}$ from 1 through m represents a consumer personalization feature. This can be used with $\emptyset_{criticality}^{predictor}(u) \rightarrow [0,1]$ to predict a criticality score for consumer requests while preparing a food item. An output of 1 from the classifier could indicate a cooking state is very critical for consumer request while preparing a food item. An output of 0 could indicate otherwise. This can be achieved by using a simple step function as the activation function for the classifier. For instance, if weighted output from the classifier is >0.5, the step function can map it to 1, otherwise it can map it to 0. There are other activation functions that can be used in classifiers, e.g., sigmoid, tan h, rectified linear unit (ReLU) in other embodiments. The criticality classifier can help in identifying the list of cooking states which are important or critical to the user.

At 114, the meal preparation assistant system transmits the consumer request and identified conflict(s) to the cook. In some embodiments, the cook can be equipped with or wear a smart wearable device, such as a smart watch, smart wristband, smart glove, or other wearable device. In some embodiments, the smart wearable device can include a screen which can provide visual information to the cook while they are preparing the food item(s) ordered by the consumer. In some embodiments, the smart wearable device can communicate with the cook through other types of notifications including audio, haptic feedback, or other notification system as appropriate. The smart wearable device can be equipped with an RFID (radio frequency identification) device capable of communicating with RFID devices placed in the kitchen or cooking environment the cook will use in preparing the meal. This concept is discussed in more detail below with regard to the sensor-enabled kitchen environment of FIG. 2. In some embodiments, in addition to, or instead of, the smart wearable device, one or more display screens can be present in the sensor-enabled kitchen environment which can display the information transmitted to the cook.

At 116, the meal preparation assistant system alerts the cook of consumer requests and any conflicts with those requests during meal preparation. The cook can also be alerted of the criticality of conflicts with requests. In embodiments where a cook is equipped with a smart wearable device with a screen, these can be displayed to the cook on the screen via text or image indications (e.g., "No meat," "baked not fried," a picture of an ingredient with a red line crossing it out, etc.). In some embodiments, RFID devices can be placed on ingredient containers and/or cooking tools, such that when the smart wearable device comes in proximity with the ingredients or cooking tools, the cook can be provided information regarding the consumer requests and any conflicts with the ingredients or cooking tools being used by the cook. In such embodiments, if a cook picks up an ingredient or cooking tool which conflicts with a consumer request, the smart wearable device can notify the cook via audio alert, haptic alert, or other alert which can notify the cook that there is a conflict with what has been picked up. The volume, intensity, or frequency of alerts can be based on the criticality score of the conflict with the consumer request (e.g., a high criticality score can result in multiple loud conflict alerts, whereas a low criticality score can result in a single haptic feedback alert).

At 118, the meal preparation assistant system monitors the cook's activity for compliance with the consumer requests. Monitoring the cook's activity can take various forms in embodiments and can include tracking the smart wearable device the cook is equipped with. Tracking the smart wearable device can include detecting which ingredient containers and cooking tools the smart wearable device came into contact or proximity with. Monitoring can include capturing a video or still images of the cook preparing the food item(s), and in some embodiments, capturing a video clip or still image of each ingredient containers and cooking tools the cook used or came into contact with. In some embodiments, weight measurements can be collected from any food scales used by the cook during food preparation. In some embodiments, the monitoring may only capture video, images, or device data relevant to the provided consumer requests or potential or actual conflicts with the consumer requests. For example, if the consumer request relates to the ingredients used in a dish, the cook's activity and data capture regarding the cook's activity may only be collected in the initial stages of meal preparation when ingredients are gathered, and unless the monitoring detects the cook comes into contact with a new ingredient later, data may not be captured further.

At 120, the meal preparation assistant system creates a log of the cook's actions in meal preparation. The log of the cook's actions in meal preparation can be a compilation of the data collected during the monitoring at 118. The log can take various forms in embodiments and may depend on the type of data collected. In some embodiments, the log can be a video of the entire meal preparation, a video compilation of the meal preparation steps which relate to consumer requests, or an image compilation of the meal preparation steps which relate to consumer requests. In other embodiments, the smart wearable device may create a text-based log (or other format appropriate to the device) of the ingredient containers or cooking tools which the smart wearable device detected. This can include converting any RFID number of applicable ingredient containers or cooking tools to a format which the cook, consumer, or other user can interpret.

At 122, the meal preparation assistant system transmits the log to the consumer. In some embodiments, the consumer may be able to receive this information on a kiosk or computer device present at their table or otherwise provided to them. In some embodiments, a food server may deliver a device to the consumer upon completion of the meal preparation upon which they can view the log. In some embodiments, a printout of a log can be generated and provided to the consumer. In some embodiments, a log can be transmitted to a consumer provided device (e.g., the log can be emailed to a consumer for viewing on their mobile phone or other device). After the log has been transmitted to the consumer, they can verify the cook's actions were in compliance with their requests and method 100 can end at 124.

Figure 2:
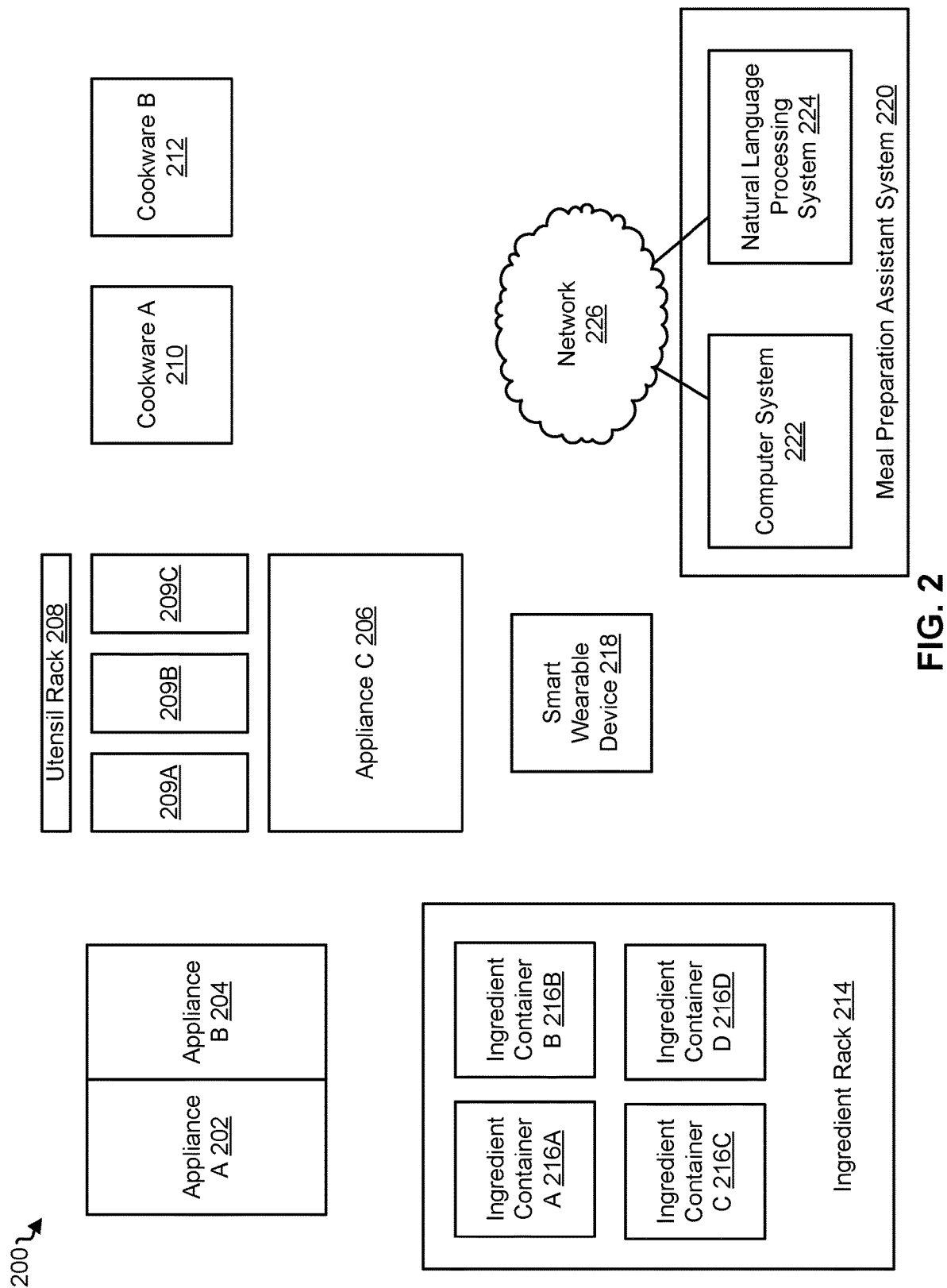
FIG. 2 depicts an example sensor-enabled kitchen environment, in accordance with embodiments of the present disclosure.

Referring now to FIG. 2, depicted is an example sensor-enabled kitchen environment 200, in accordance with embodiments of the present disclosure. FIG. 2 shows a sensor-enabled kitchen environment 200 which includes appliances A, B, and C (202, 204, and 206, respectively), utensil rack 208 with utensils 209A, 209B, and 209C, cookware A and B (210 and 212 respectively), ingredient rack 214, ingredient containers A, B, C, and D (216A, 216B, 216C, and 216D respectively), smart wearable device 218, a meal preparation assistant system 220 including computer system 222 and natural language processing system 224, and network 226. Sensor-enabled kitchen environment 200 can be more or less complicated in embodiments, including additional appliances, utensils, cookware, ingredient racks, ingredient containers, computers, or the like. Additionally, one or more components may be combined or omitted in embodiments. The example items discussed as present in sensor-enabled kitchen environment 200 are provided for exemplary purposes and are not to be read as limiting; many other types of utensils, cookware, appliances, and ingredient containers can exist in embodiments.

Appliances A, B, and C (202, 204, and 206, respectively) can be any kitchen appliances in embodiments, such as stoves, ovens, blenders, refrigerators, freezers, toasters, crock pots, dishwashers, etc., but as depicted here, Appliance A is a freezer, Appliance B is a refrigerator, and Appliance C is a stove. Appliances A, B, and C (202, 204, and 206, respectively) can each be equipped with a sensor such as an RFID chip or a smart tag. In some embodiments, one or more of the appliances can be a smart appliance with further computer enabled technology. In some embodiments, one or more of Appliances A, B, and C (202, 204, and 206, respectively) can include multiple RFID chips, such as one near each burner of a stove or on each shelf of a refrigerator. During meal preparation, a cook, such as a cook equipped with smart wearable device 218 can come into contact with, or use, one or more of Appliances A, B, and C (202, 204, and 206, respectively), and this activity can be monitored and their actions logged (such as at operations 118 and 120 of FIG. 1 above). This can be to verify compliance with a consumer request, which for example, could be a request that fresh not frozen ingredients are used (where interaction with Appliance A (202) may be a conflict with the consumer request).

Utensil rack 208 can hold various utensils 209A, 209B, and 209C (collectively utensils 209). Utensils 209 can include various kitchen utensils such as spoons, knives, forks, spatulas, ladles, etc. Each of utensils 209 can be equipped with a sensor such as an RFID chip or a smart tag such that their use can be monitored and logged during meal preparation. Use of a particular utensil may not be monitored in all embodiments, but could relate to a consumer request that an item be stirred rather than shaken or hand whipped, rather than blended.

Also depicted are cookware A and B (210 and 212 respectively), each of which may similarly be equipped with a sensor. Cookware A and B (210 and 212 respectively) can take various forms in embodiments including pots, pans, bowls, cups, plates, cutting boards, mixing bowls, or other cookware objects used in meal preparation.

Ingredient rack 214 is shown in FIG. 2 as a single entity containing four ingredient containers A, B, C, and D (216A, 216B, 216C, and 216D respectively, herein ingredient containers 216 collectively). In some embodiments more or fewer ingredient racks and/or ingredient containers may be present in a sensor enabled kitchen environment 200. In some embodiments, ingredients may be present at a location other than an ingredient rack and some ingredients may not be in containers (e.g., a loaf of bread or piece of fruit may not be in a container). Each of ingredient containers 216 can be equipped with a sensor such as an RFID chip or a smart tag such that their use can be monitored and logged during meal preparation. In some embodiments, the sensor for an ingredient container may be on the rack or location where an ingredient container or ingredient without a container is stored, such that when the weight of the ingredient container is lifted, this may be sensed, which can be used for ingredients or ingredient containers which affixing an RFID chip or other sensor to may be difficult. In some embodiments, rather than an RFID chip or sensor affixed to each of the ingredient containers 216, a sensor array may be present which monitors the ingredient rack 214 (or other area of sensor enabled kitchen environment 200) via video camera or otherwise and can identify when one or more ingredient containers are interacted with, including by a cook wearing smart wearable device 218.

Smart wearable device 218 can be a smart watch, smart wristband, smart glove, or other wearable device. In some embodiments, the smart wearable device can include a screen which can provide visual information to the cook while they are preparing the food item(s) ordered by the consumer. In some embodiments, the smart wearable device can communicate with the cook through other types of notifications including audio, haptic feedback, or other notification system as appropriate. The smart wearable device can be equipped with an RFID device capable of communicating with RFID devices or other sensors placed in sensor-enabled kitchen environment 200.

Meal preparation assistant system 220 can be the same meal preparation assistant system used in performance of method 100 of FIG. 1. It can include computer system 222, which can also be consistent with computer system 400 of FIG. 4 and can include natural language processing system 224. Computer system 222 can use the input from a consumer providing an order and consumer requests, recipes (which may be stored in computer system 222), and sensor data received from the smart wearable device 218 or sensors affixed to the appliances, utensils, cookware, ingredient containers, etc. in determining conflicts with consumer requests, providing information to the smart wearable device, monitoring the actions of the cook, and preparing and transmitting a log of the actions of the cook during meal preparation in accordance with method 100. Computer system 222 can be comprised of various components (not depicted), including input/output devices such as a keyboard, mouse, display, smart speaker, and other components. As depicted here, computer system 222 can be connected by network 226 to a natural language processing system 224, which may be present on a cloud-based system. In other embodiments, natural language processing system 224 can be a part of or otherwise connected to computer system 222. Network 226 can be the internet, a local area network (LAN), a company intranet, a combination of networks, or another network configuration. Natural language processing system 224 can be used in performance of method 100, particularly with regard to operation 108 involving analyzing recipes for ingredients and meal preparation steps. To reduce clutter in the figure, each of the sensor enabled appliances, utensils, and cookware are not depicted as connected to network 226 but can be connected wirelessly to the network in embodiments. In other embodiments, computer system 222 can broadcast one or more signals to the sensors and receive return signals from the sensors as appropriate.

Figure 3:
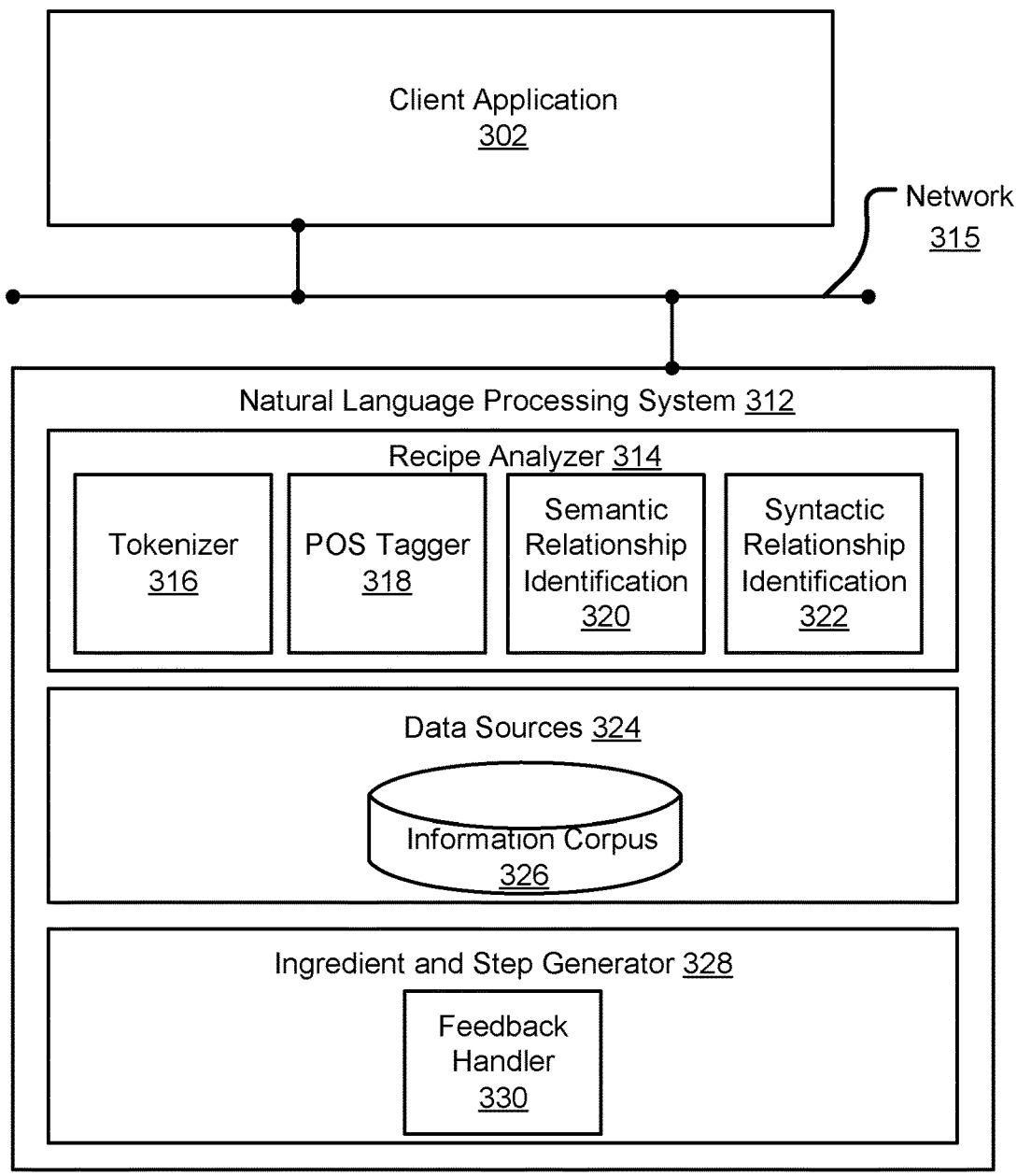
FIG. 3 depicts a natural language processing system, in accordance with embodiments of the present disclosure.

FIG. 3 depicts a natural language processing environment 300, in accordance with embodiments of the present disclosure. Aspects of FIG. 3 are directed toward an exemplary natural language processing environment 300 in performance of method 100, particularly with regard to operation 108 involving analyzing recipes for ingredients and meal preparation steps. Natural language processing environment 300 can be remote from the sensor-enabled kitchen environment and connected e.g., by cloud technology. In other embodiments, natural language processing environment 300 can be a part of or otherwise connected to a computer system, such as computer system 222 of FIG. 2 or computer system 400 of FIG. 4. In certain embodiments, one or more users may send recipes for analysis via a client application 302 to natural language processing system 312 using a remote device (such as computer system 222 of FIG. 2 or computer system 400 of FIG. 4). In other embodiments, natural language processing system 312 can be employed to access recipes in a database or the internet upon request from a client application 302, which may be a meal preparation assistant system. Natural language processing system 312 can perform methods and techniques for responding to the requests sent by one or more client application 302. In certain embodiments, the information received at natural language processing system 312 may correspond to input recipes received from users, where the input recipes may be expressed in a free form and in natural language.

In certain embodiments, client application 302 and natural language processing system 312 can be communicatively coupled through network 315 (e.g., the Internet, intranet, or other public or private computer network), which may be consistent with network 226 of FIG. 2. In certain embodiments, natural language processing system 312 and client application 302 may communicate by using Hypertext Transfer Protocol (HTTP) or Representational State Transfer (REST) calls. In certain embodiments, natural language processing system 312 may reside on a server node. Client application 302 may establish server-client communication with natural language processing system 312 or vice versa. In certain embodiments, the network 315 can be implemented within a cloud computing environment or using one or more cloud computing services. Consistent with various embodiments, a cloud computing environment can include a network-based, distributed data processing system that provides one or more cloud computing services.

Consistent with various embodiments, natural language processing system 312 may respond to information sent by client application 302 (e.g., recipes provided by users). Natural language processing system 312 can analyze the received recipes. In certain embodiments, natural language processing system 312 may include a recipe analyzer 314, data sources 324, and ingredient and step generator 328. Recipe analyzer 314 can be a computer module that analyzes the received recipes. In certain embodiments, recipe analyzer 314 can perform various methods and techniques for analyzing the recipes syntactically and semantically. In certain embodiments, recipe analyzer 314 can parse received recipes. Recipe analyzer 314 may include various modules to perform analyses of received recipes. For example, computer modules that recipe analyzer 314 may encompass include, but are not limited to, a tokenizer 316, part-of-speech (POS) tagger 318, semantic relationship identification 320, and syntactic relationship identification 322. In certain embodiments, the recipe analyzer 314 can include using a natural language processing technique.

Consistent with various embodiments, tokenizer 316 may be a computer module that performs lexical analysis. Tokenizer 316 can convert a sequence of characters into a sequence of tokens. Tokens may be string of characters typed by a user and categorized as a meaningful symbol. Further, in certain embodiments, tokenizer 316 can identify word boundaries in an input recipe and break the recipe or any text into its component parts such as words, multiword tokens, numbers, and punctuation marks. In certain embodiments, tokenizer 316 can receive a string of characters, identify the lexemes in the string, and categorize them into tokens.

Consistent with various embodiments, POS tagger 318 can be a computer module that marks up a word in a text to correspond to a particular part of speech. POS tagger 318 can read a recipe or other text in natural language and assign a part of speech to each word or other token. POS tagger 318 can determine the part of speech to which a word corresponds based on the definition of the word and the context of the word. The context of a word may be based on its relationship with adjacent and related words in a phrase, sentence, question, or paragraph. In certain embodiments, context of a word may be dependent on one or more previously provided recipes. Examples of parts of speech that may be assigned to words include, but are not limited to, nouns, verbs, adjectives, adverbs, and the like. Examples of other part of speech categories that POS tagger 318 may assign include, but are not limited to, comparative or superlative adverbs, wh-adverbs (e.g., when, where, why, whence, whereby, wherein, whereupon), conjunctions, determiners, negative particles, possessive markers, prepositions, wh-pronouns (e.g., who, whom, what, which, whose), and the like. In certain embodiments, POS tagger 318 can tag or otherwise annotate tokens of a recipe with part of speech categories. In certain embodiments, POS tagger 318 can tag tokens or words of a recipe to be parsed by natural language processing system 312.

Consistent with various embodiments, semantic relationship identification 320 may be a computer module that can identify semantic relationships of recognized identifiers in recipes provided by users. For example, the semantic relationship identification 320 may include identifying recognized identifiers such as location names, appliance types, cookware types, utensil types, brand names, ingredients, institutions, corporations, and other entities. In certain embodiments, semantic relationship identification 320 may determine functional dependencies between entities, the dimension associated to a member, and other semantic relationships.

Consistent with various embodiments, syntactic relationship identification 322 may be a computer module that can identify syntactic relationships in a recipe composed of tokens provided by users to natural language processing system 312. Syntactic relationship identification 322 can determine the grammatical structure of sentences, for example, which groups of words are associated as "phrases" and which word is the subject or object of a verb. In certain embodiments, syntactic relationship identification 322 can conform to a formal grammar.

In certain embodiments, recipe analyzer 314 may be a computer module that can parse a received recipe and generate a corresponding data structure of the recipe. For example, in response to receiving a recipe at natural language processing system 312, recipe analyzer 314 can output the parsed recipe as a data structure. In certain embodiments, the parsed recipe may be represented in the form of a parse tree or other graph structure. To generate the parsed recipe, recipe analyzer 314 may trigger computer modules 316-322. Recipe analyzer 314 can use functionality provided by computer modules 316-322 individually or in combination. Additionally, in certain embodiments, recipe analyzer 314 may use external computer systems for dedicated tasks that are part of the recipe parsing process.

Consistent with various embodiments, the output of recipe analyzer 314 can be used by natural language processing system 312 to perform a search of one or more data sources 324 to identify ingredients and meal preparation steps included in the recipe. In certain embodiments, data sources 324 may include data warehouses, information corpora, data models, and document repositories. In certain embodiments, the data source 324 can be an information corpus 326. The information corpus 326 can enable data storage and retrieval. In certain embodiments, the information corpus 326 may be a storage mechanism that houses a standardized, consistent, clean and integrated form of data. The data may be sourced from various operational systems. Data stored in the information corpus 326 may be structured in a way to specifically address reporting and analytic requirements. In one embodiment, the information corpus may be a relational database. In some example embodiments, data sources 324 may include one or more document repositories.

In certain embodiments, ingredient and step generator 328 may be a computer module that generates a list of ingredients and a list of meal preparation steps for the recipe. Consistent with various embodiments, ingredient and step generator 328 may include a feedback handler 330.

In certain embodiments, feedback handler 330 can be a computer module that processes feedback from users on lists of ingredients and lists of meal preparation steps for the recipe generated by ingredient and step generator 328. In certain embodiments, users may be engaged in dialog with the natural language processing system 312 to evaluate the relevance of received lists of ingredients and lists of meal preparation steps. In certain embodiments, the feedback of users on these lists may be used for future natural language processing sessions.

The various components of the exemplary natural language processing system described above may be used to implement various aspects of the present disclosure. For example, the client application 302 could be used to receive one or more recipes. The recipe analyzer 314 could, in certain embodiments, use a natural language processing technique to analyze the recipes, and identify keywords and word relationships in the recipes. Further, the natural language processing system 312 could, in certain embodiments, compare the keywords to an information corpus 326 to determine which keywords are ingredients. The ingredient and step generator 328 can be used to formulate lists of ingredients and lists of meal preparation steps based on the recipes input to the natural language processing system 312.

Figure 4:
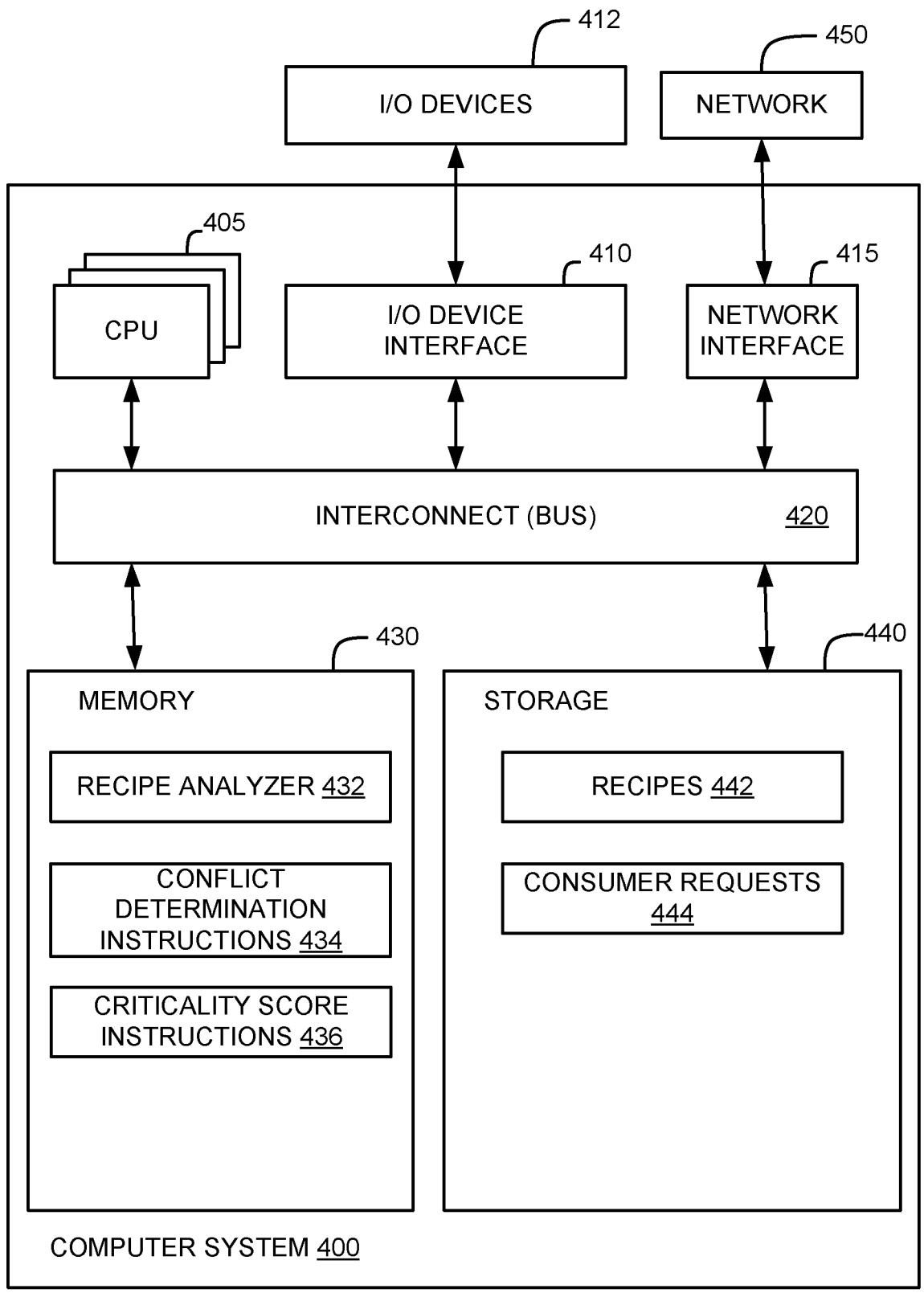
FIG. 4 illustrates a block diagram of a computer system, in accordance with some embodiments of the present disclosure.

Referring now to FIG. 4, illustrated is a block diagram of a computer system 400, in accordance with some embodiments of the present disclosure. In some embodiments, computer system 400 performs operations in accordance with FIG. 1 as described above. In some embodiments, computer system 400 can be consistent with computer system 222 of FIG. 2. The computer system 400 can include one or more processors 405 (also referred to herein as CPUs 405), an I/O device interface 410 which can be coupled to one or more I/O devices 412, a network interface 415, an interconnect (e.g., BUS) 420, a memory 430, and a storage 440.

In some embodiments, each CPU 405 can retrieve and execute programming instructions stored in the memory 430 or storage 440. The interconnect 420 can be used to move data, such as programming instructions, between the CPUs 405, I/O device interface 410, network interface 415, memory 430, and storage 440. The interconnect 420 can be implemented using one or more busses. Memory 430 is generally included to be representative of a random access memory (e.g., static random access memory (SRAM), dynamic random access memory (DRAM), or Flash).

In some embodiments, the memory 430 can be in the form of modules (e.g., dual in-line memory modules). The storage 440 is generally included to be representative of a non-volatile memory, such as a hard disk drive, solid state device (SSD), removable memory cards, optical storage, or flash memory devices. In an alternative embodiment, the storage 440 can be replaced by storage area-network (SAN) devices, the cloud, or other devices connected to the computer system 400 via the I/O devices 412 or a network 450 via the network interface 415.

The CPUs 405 can be a single CPU, multiple CPUs, a single CPU having multiple processing cores, or multiple CPUs with one or more of them having multiple processing cores in various embodiments. In some embodiments, a processor 405 can be a digital signal processor (DSP). The CPUs 405 can additionally include one or more memory buffers or caches (not depicted) that provide temporary storage of instructions and data for the CPUs 405. The CPUs 405 can be comprised of one or more circuits configured to perform one or more methods consistent with embodiments of the present disclosure.

The memory 430 of computer system 400 includes recipe analyzer 432, conflict determination instructions 434, and criticality score instructions 436. Recipe analyzer 432 can be an application or compilation of computer instructions for analyzing one or more recipes. Recipe analyzer 432 can be an ontology-based system, a natural language processing system, such as natural language processing system 312 of FIG. 3 and/or a set of instructions for interfacing with such systems. Recipe analyzer 432 can analyze received recipes for ingredients and meal preparation steps.

Conflict determination instructions 434 can be an application or compilation of computer instructions for determining whether one or more conflicts exist between consumer requests 444 and ingredients or cooking steps determined by recipe analyzer 432 in accordance with method 100 of FIG. 1, particularly operation 110 as discussed above.

Criticality instructions 436 can be an application or compilation of computer instructions for determining a criticality score for each conflict determined by conflict determination instructions 434 and can operate in accordance with any or all of the embodiments of determining criticality scores discussed above with regard to operation 112 of method 100.

Storage 440 contains recipes 442 and consumer requests 444. Recipes 442 can be recipes input into computer system 400 in any format including text recipes, scanned pages of cookbooks, a website address where the website contains a recipe, etc. Recipes 442 can be input into computer system 400 using a client application, by accessing a database or other repository of recipes, or by crawling the internet for recipes, and can be analyzed using recipe analyzer 432.

Consumer requests 444 can be various types of requests for one or more food items. Consumer requests can take many forms including those discussed above such as medically imposed dietary restrictions, dietary restrictions for purposes of losing weight, dietary restrictions for ethical concerns, personal preferences for ingredients, and preferences for steps to be taken during meal preparation. Consumer requests 444 can be used by conflict determination instructions 434 in determining whether one or more conflicts exist between the ingredients or cooking steps involved in a recipe and the consumer requests 444.

In some embodiments as discussed above, the memory 430 stores recipe analyzer 432, conflict determination instructions 434, and criticality score instructions 436, and the storage 440 stores recipes 442, and consumer requests 444. However, in various embodiments, each of the recipe analyzer 432, conflict determination instructions 434, criticality score instructions 436, recipes 442, and consumer requests 444 are stored partially in memory 430 and partially in storage 440, or they are stored entirely in memory 430 or entirely in storage 440, or they are accessed over a network 450 via the network interface 415.

In various embodiments, the I/O devices 412 can include an interface capable of presenting information and receiving input. For example, I/O devices 412 can receive input from a user and present information to a user and/or a device interacting with computer system 400. In some embodiments, I/O devices 412 include one or more of sensors such as RFID chips or smart tags associated with one or more of the appliances, utensils, cookware, and/or ingredient containers of FIG. 2. In some embodiments, I/O devices 412 can include a display and/or an audio speaker for presenting information to a user of computer system 400.

The network 450 can connect (via a physical or wireless connection) the computer system 400 with other networks, and/or one or more devices that interact with the computer system. In some embodiments, network 450 is consistent with network 226 of FIG. 2 and/or network 315 of FIG. 3.

Logic modules throughout the computer system 400—including but not limited to the memory 430, the CPUs 405, and the I/O device interface 410—can communicate failures and changes to one or more components to a hypervisor or operating system (not depicted). The hypervisor or the operating system can allocate the various resources available in the computer system 400 and track the location of data in memory 430 and of processes assigned to various CPUs 405. In embodiments that combine or rearrange elements, aspects and capabilities of the logic modules can be combined or redistributed. These variations would be apparent to one skilled in the art.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
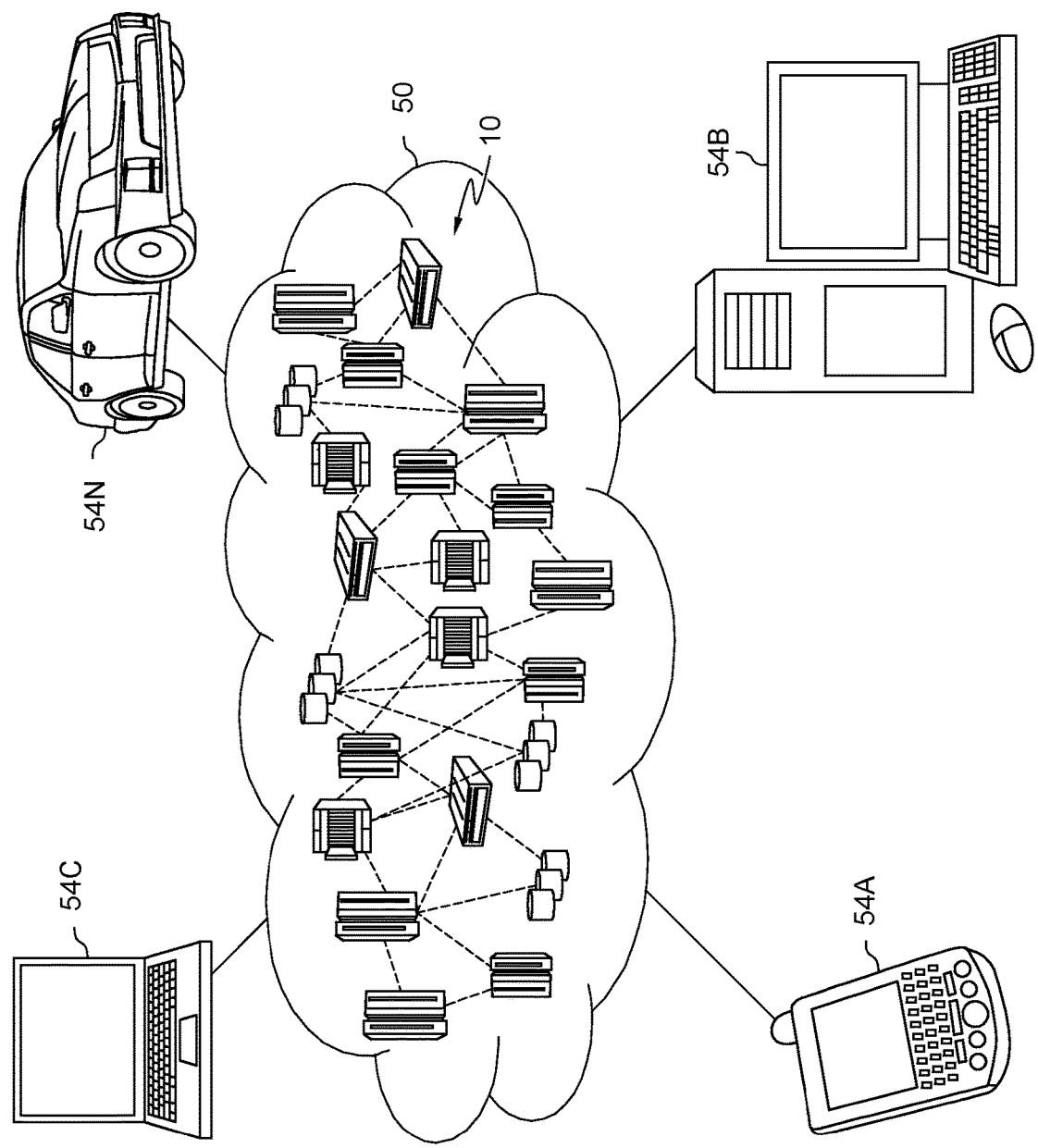
FIG. 5 depicts a cloud computing environment according to some embodiments of the present disclosure.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
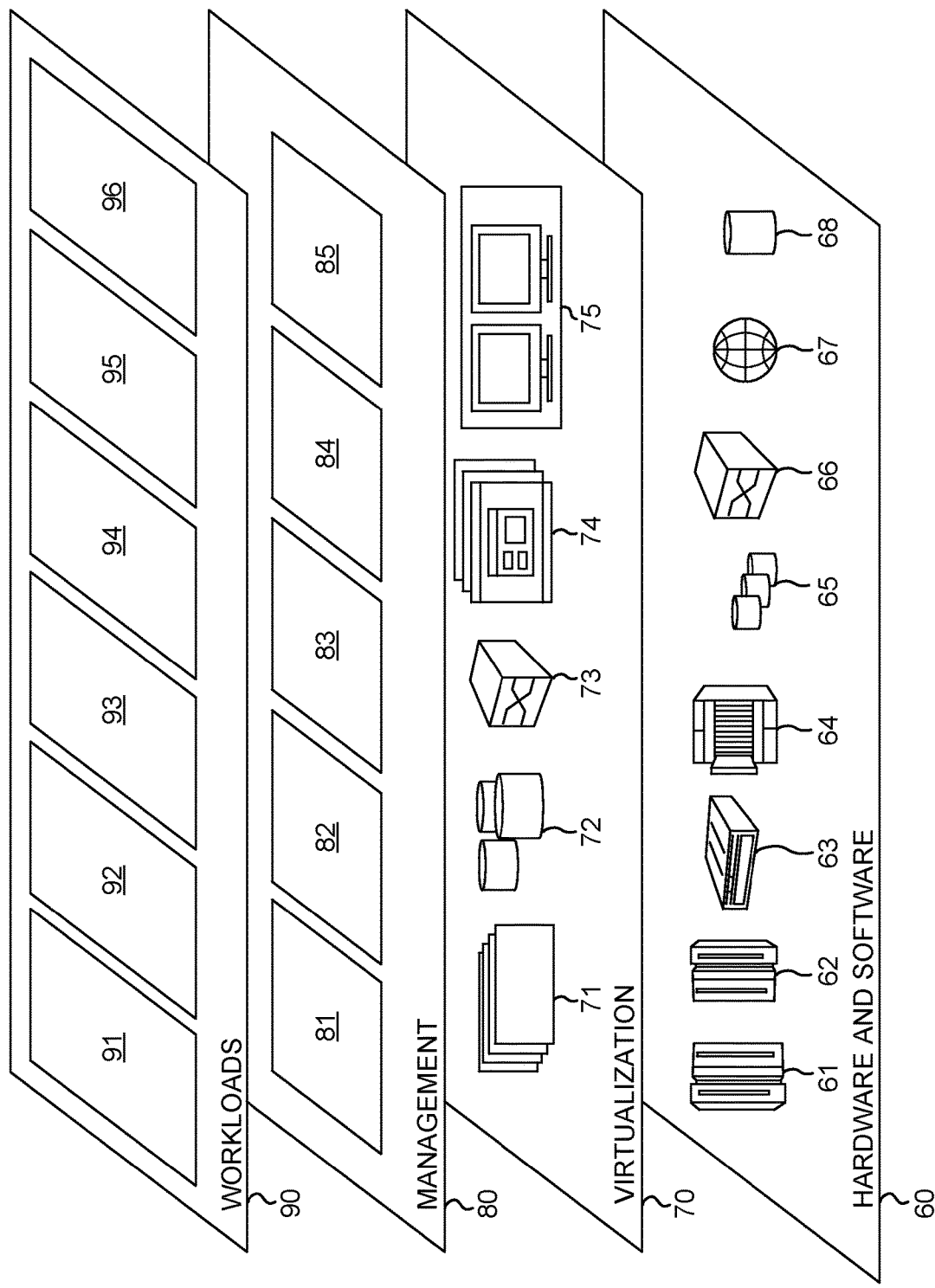
FIG. 6 depicts abstraction model layers according to some embodiments of the present disclosure.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and meal preparation assistant system 96. Meal preparation assistant system 96 can be a workload or function such as that described in FIG. 1 above. In other embodiments, only a portion of the processing of a smart meal preparation system may be cloud based, such as a natural language processing system as depicted in FIG. 3.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But, the various embodiments can be practiced without these specific details. In other instances, well-known circuits, structures, and techniques have not been shown in detail in order not to obscure embodiments.

What is claimed is:

1. A computer-implemented method for smart meal preparation, the method comprising:
   receiving a consumer order for a food item and a consumer request related to the food item;
   receiving one or more recipes for the food item;
   analyzing the one or more recipes to determine a conflict with the consumer request;
   transmitting the consumer request and the determined conflict to a wearable device worn by a cook who will prepare the food item;
   providing alerts related to the conflict to the cook via the wearable device during preparation of the food item; and
   monitoring preparation of the food item for compliance with the consumer request, wherein monitoring preparation of the food item for compliance with the consumer request further comprises:
   detecting, using the wearable device worn by the cook, a proximity of the wearable device to an ingredient; and
   determining the cook has used the ingredient due to the proximity.

2. The method of claim 1, further comprising:
   logging actions performed by the cook during preparation of the food item.

3. The method of claim 2, wherein a log created during logging actions performed by the cook during preparation of the food item is in a format selected from the group consisting of video recording, still images, and a text log of sensor data.

4. The method of claim 3, further comprising:
   transmitting the log to a consumer who placed the consumer order.

5. The method of claim 1, wherein detecting the proximity of the wearable device to the ingredient is performed using a radio frequency identification device in the wearable device and a radio frequency identification chip associated with the ingredient.

6. The method of claim 1, wherein analyzing the one or more recipes to determine a conflict with the consumer request comprises:
analyzing the one or more recipes to identify a plurality of ingredients of the one or more recipes and a plurality of cooking steps of the one or more recipes.

7. The method of claim 1, wherein the consumer request related to the food item is determined by a computer from an audible statement made by a consumer.

8. The method of claim 1, further comprising:
determining a criticality score for the conflict with the consumer request; and
wherein the alerts to the cook vary based on the determined criticality score.

9. The method of claim 8; wherein the criticality score is determined using a binary classifier trained using consumer requests and food preparation states.

10. A system for smart meal preparation, the system comprising:
one or more processors;
a wearable device; and
a memory communicatively coupled to the one or more processors,
wherein the memory comprises instructions which, when executed by the one or more processors, cause the one or more processors to perform a method comprising:
receiving a consumer order for a food item and a consumer request related to the food item;
receiving one or more recipes for the food item;
analyzing the one or more recipes to determine a conflict with the consumer request;
transmitting the consumer request and the determined conflict to the wearable device worn by a cook who will prepare the food item;
providing alerts related to the conflict to the cook via the wearable device during preparation of the food item; and
monitoring preparation of the food item for compliance with the consumer request, wherein monitoring preparation of the food item for compliance with the consumer request further comprises:
detecting, using the wearable device worn by the cook, a proximity of the wearable device to an ingredient; and
determining the cook has used the ingredient due to the proximity.

11. The system of claim 10, further comprising:
logging actions performed by the cook during preparation of the food item; and
transmitting the logged actions to a consumer who placed the consumer order.

12. The system of claim 10, wherein detecting the proximity of the wearable device to the ingredient is performed using a radio frequency identification device in the wearable device and a radio frequency identification chip associated with the ingredient.

13. The system of claim 10, further comprising:
determining a criticality score for the conflict with the consumer request; and
wherein the alerts to the cook vary based on the determined criticality score.

14. A computer program product for smart meal preparation, the computer program product comprising a non-transitory computer readable storage medium having program instructions embodied therewith, the program instructions executable by a computer to perform a method comprising:
receiving a consumer order for a food item and a consumer request related to the food item;
receiving one or more recipes for the food item;
analyzing the one or more recipes to determine a conflict with the consumer request;
transmitting the consumer request and the determined conflict to the wearable device worn by a cook who will prepare the food item;
providing alerts related to the conflict to the cook via the wearable device during preparation of the food item; and
monitoring preparation of the food item for compliance with the consumer request, wherein monitoring preparation of the food item for compliance with the consumer request further comprises:
detecting, using the wearable device worn by the cook, a proximity of the wearable device to an ingredient; and
determining the cook has used the ingredient due to the proximity.

15. The computer program product of claim 14, further comprising:
logging actions performed by the cook during preparation of the food item; and
transmitting the logged actions to a consumer who placed the consumer order.

16. The computer program product of claim 14, wherein detecting the proximity of the wearable device to the ingredient is performed using a radio frequency identification device in the wearable device and a radio frequency identification chip associated with the ingredient.

17. The computer program product of claim 14, further comprising:
determining a criticality score for the conflict between the consumer request and the analysis of the one or more recipes; and
wherein the alerts to the cook vary based on the determined criticality score.

\* \* \* \* \*